US009786049B2

(12) United States Patent
Ouji

(10) Patent No.: US 9,786,049 B2
(45) Date of Patent: Oct. 10, 2017

(54) METHOD FOR REMOVING A SUPPORT OF AN OBJECT FROM VOLUME DATA

(71) Applicant: AGFA HEALTHCARE, Mortsel (BE)

(72) Inventor: Asma Ouji, Mortsel (BE)

(73) Assignee: AGFA HEALTHCARE NV, Mortsel (BE)

( * ) Notice: Subject to any disclaimer, the term of this patent is extended or adjusted under 35 U.S.C. 154(b) by 2 days.

(21) Appl. No.: 15/027,703

(22) PCT Filed: Nov. 4, 2014

(86) PCT No.: PCT/EP2014/073648
§ 371 (c)(1),
(2) Date: Apr. 7, 2016

(87) PCT Pub. No.: WO2015/067589
PCT Pub. Date: May 14, 2015

(65) Prior Publication Data
US 2016/0247278 A1   Aug. 25, 2016

(30) Foreign Application Priority Data
Nov. 5, 2013 (EP) .................................. 13191491

(51) Int. Cl.
| | | |
|---|---|---|
| G06K 9/00 | (2006.01) |
| G06T 7/00 | (2017.01) |
| G06K 9/46 | (2006.01) |
| G06K 9/52 | (2006.01) |
| G06K 9/62 | (2006.01) |
| G06T 11/60 | (2006.01) |
| G06T 7/11 | (2017.01) |

(52) U.S. Cl.
CPC .......... *G06T 7/0012* (2013.01); *G06K 9/4642* (2013.01); *G06K 9/52* (2013.01); *G06K 9/6201* (2013.01); *G06K 9/6267* (2013.01); *G06T 7/11* (2017.01); *G06T 11/60* (2013.01); *G06T 2207/10081* (2013.01); *G06T 2207/20024* (2013.01); *G06T 2207/30004* (2013.01)

(58) Field of Classification Search
CPC .................................................. A61B 6/5252
See application file for complete search history.

(56) References Cited

U.S. PATENT DOCUMENTS

| | | | |
|---|---|---|---|
| 5,832,134 A | 11/1998 | Avinash et al. |
| 8,160,346 B2 | 4/2012 | Gatesoupe et al. |
| 2008/0118133 A1 | 5/2008 | Sirohey et al. |
| 2012/0219198 A1 | 8/2012 | Mohr |

FOREIGN PATENT DOCUMENTS

EP          1 793 350 A1    6/2007

OTHER PUBLICATIONS

Official Communication issued in International Patent Application No. PCT/EP2014/073648 dated Feb. 23, 2015.
Zhu et al., "Automatic Patient Table Removal in CT images", Journal of Digital Imaging, Jan. 19, 2012, pp. 180-485.

*Primary Examiner* — Atiba O Fitzpatrick
(74) *Attorney, Agent, or Firm* — Keating and Bennett, LLP

(57) ABSTRACT

Volume data representing a radiation image of an object are subjected to a coarse filtering process to obtain a first classification including support type and non-support type components. An iteration of low threshold filtering steps and successive extraction and classification of connected components is performed and used to rectify the result of the coarse filtering process. A further filtering is based on the location of the connected components in the volume.

8 Claims, 3 Drawing Sheets

METHOD FOR REMOVING A SUPPORT OF AN OBJECT FROM VOLUME DATA

CROSS-REFERENCE TO RELATED APPLICATIONS

This application is a 371 National Stage Application of PCT/EP2014/073648, filed Nov. 4, 2014. This application claims the benefit of European Application No. 13191491.3, filed Nov. 5, 2013, which is incorporated by reference herein in its entirety.

BACKGROUND OF THE INVENTION

1. Field of the Invention

The present invention relates to a method for removing a patient support such as a head support from a radiation image, e.g. from a CT image.

2. Description of the Related Art

In many medical imaging applications the patient or at least the body part that is examined is held in place by a so called table or support, supports of specific shapes are used to position and hold specific parts of the body such as a head supporting cradle or a foot or hand restraint. These supports may have different shapes and may have different positions during examination.

In the context of the preferred embodiments of the present invention table, support, restraint cradle are used as synonyms.

When a radiation image such as a CT or a CTA image, of the patient or of the body part is then taken, the final image comprises an image of the support in addition to the image of the patient or the body part.

The image of the support is sometimes removed from the image within the modality, but most of the image reconstructions still include an image of the support.

Removing support images from such images is important for several reasons, some of which are set out below.

Regarding the visualization, tables can affect the image sharpness making the diagnosis more complex. FIG. 1 shows a CT volume without and with table removal.

For patient follow up applications, images (2D images or 3D volumes) of the same patient which are taken at different periods of time are registered and compared to each other in order to follow pathology evolution. For such registration process, it is important that the image content is the same and the presence of different tables may affect the registration. In the same way, removing tables is important for PET/CT registration.

Due to the wide variability in table designs, shapes, luminosities and textures, as is shown in FIG. 2, on one hand and the inconstant patient positions on the other hand, automating the table removal process is a challenging task.

The article 'Automatic Patient Table Removal in CT images' by Yang-Ming Zhu et al., Journal of Digital Imaging (2012) 25:480-485 relates to automatic table removal in CT images.

The article describes a method for automatic table removal which first identifies and locates the patient table in the sagittal planes of the CT images and then removes it from the axial planes.

The method is based on thresholding with a single, fixed threshold value. The method fails when the table cross section varies axially (such as in the case of a patient head support).

It is an aspect of the present invention to provide a method for removal of an image of a support of an object from data representing a radiation image of said object, more specifically for providing a method for table removal in CT images. It is a purpose to provide such a method that is generic and automated, and that does not require any pre-acquired template representation of said support.

SUMMARY OF THE INVENTION

The above-mentioned advantageous effects are realised by a method having the specific features set out below. Specific features for preferred embodiments of the invention are also set out below.

A method of the present invention is based on feature analysis of components extracted at different thresholds. As there are no training data used, the proposed approach uses a number of heuristics to filter the detected table components.

Iterative filtering operations are performed in a method of this invention to avoid any misclassification which may lead to removing body tissue instead of table parts, and also to ensure that all table parts are correctly detected.

This algorithm is highly parallelizable, which implies that large data sets with complex features can be processed within few seconds.

In the context of preferred embodiments of the present invention table and support are used to refer to the same item, namely a support that should be removed from the image/volume representation.

Also in the context of preferred embodiments of this invention 'table type class' and 'support type class' are used as synonyms and 'non-table type class' and 'body-type class' are also used as synonyms.

A method of the present invention is generally implemented in the form of a computer program product adapted to carry out the method steps of the present invention when run on a computer. The computer program product is commonly stored in a computer readable carrier medium such as a DVD. Alternatively the computer program product takes the form of an electric signal and can be communicated to a user through electronic communication.

Further advantages and preferred embodiments of the present invention will become apparent from the following description and drawings.

BRIEF DESCRIPTION OF THE DRAWINGS

FIG. 1(b) shows a CT volume with table removal having been performed.

DETAILED DESCRIPTION OF THE PREFERRED EMBODIMENTS

A method of the present invention is applicable to image data obtained by irradiating an object by penetrating radiation such as x-rays.

An example of an imaging systems providing such images is a CT (Computed Tomography) imaging system or a CTA (Computed Tomography Angiography) which are well known in the art.

In such a CT or CTA imaging system a patient or object to be examined is moved into a gantry in which the patient or object is irradiated by a rotating array of x-ray sources.

The radiation transmitted by the patient or object is detected and recorded by radiation detectors at several positions of the rotating array of x-ray sources.

The CT or CTA imaging apparatus uses a software algorithm to compute a radiation image of the patient or the object, i.e. to compute the amount of x-radiation absorbed by every element of the patient or the object.

Each of these element of the radiation image is represented by a voxel the density of which (the amount of x-radiation absorbed) is expressed in Hounsfield units.

The digital voxel representations are finally used for further processing, display, diagnosis and/or storage.

Figure 1:
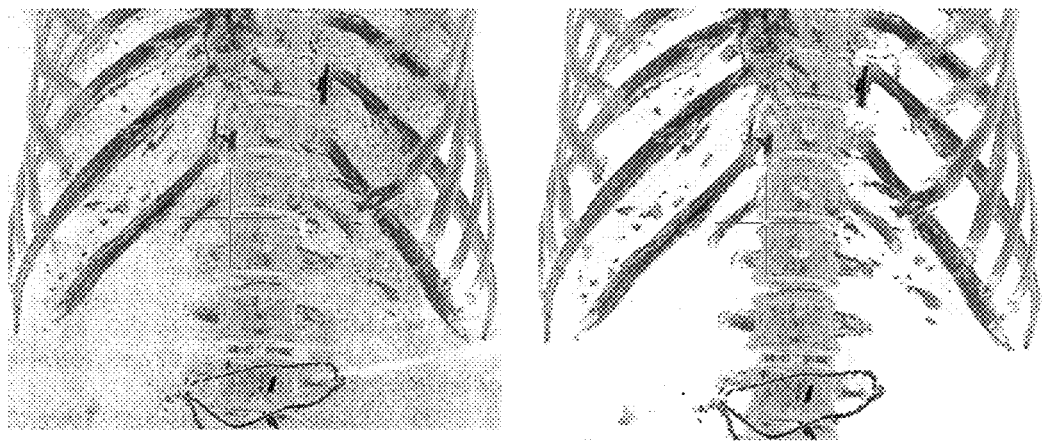
FIG. 1 shows a CT volume, (a) represents a CT volume without table removal having been performed.
Figure 2:
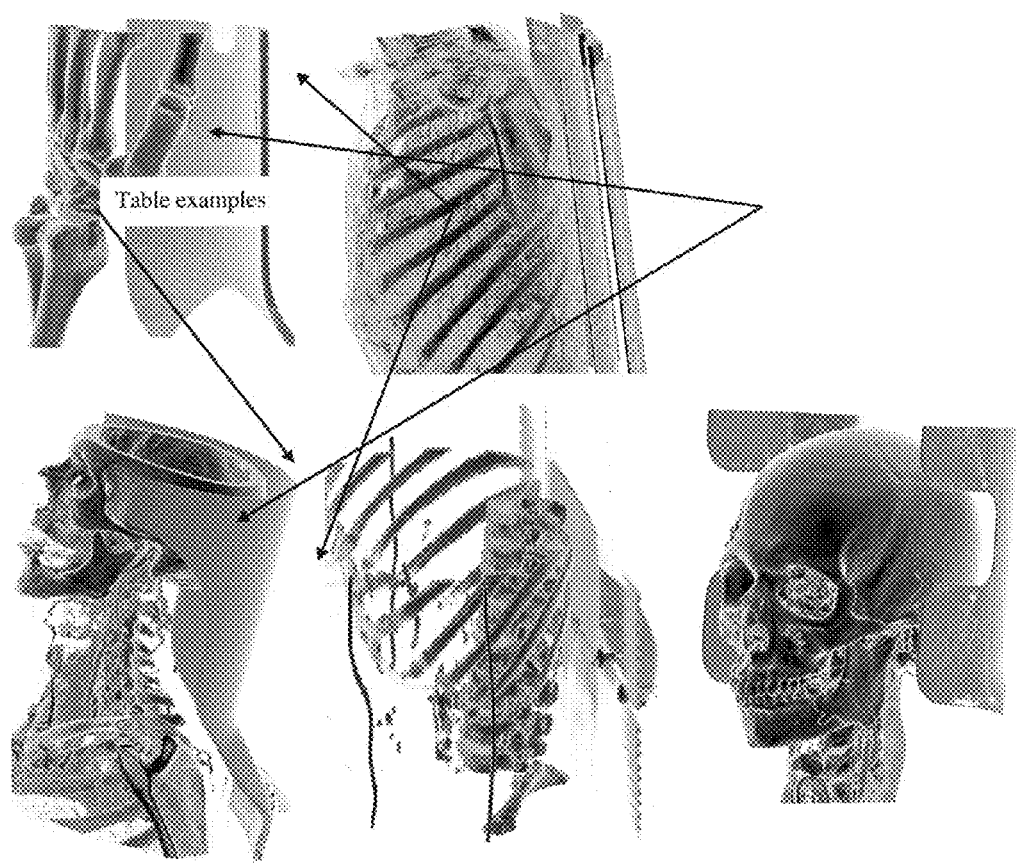
FIG. 2 shows examples of table shapes and positions.

When being moved into the gantry, the patient is supported on a supporting table. For some types of examinations, the body part to be irradiated is supported by a specific type of supporting means as shown in FIG. 2.

Since the supporting table and occasionally the specific support are present during the irradiation of the patient, a radiation image of this table and/or support will also be present in the radiation image of the body or body part that is irradiated.

A method of the present invention processes the digital image representation in order to identify and eliminate the part of the image that represents this table or support.

The algorithm of the present invention generally comprises the following three steps:
1. a coarse filtering of the volume representation of the radiation image,
2. an iteration of low threshold filtering steps,
3. a filtering based on the location of a component within the entire image.

1. The First Step is a Coarse Filtering Step.

This step consists in classifying connected components extracted under a high Hounsfield (HU) threshold from the volume representation, based on morphological features.

Threshold Definition

The threshold value for the first filtering step is determined based on the histogram of the image data.

Let min_value and max_value be the minimum and maximum HU values respectively in the acquired image/volume.

The high thresholding value can be determined as defined in the following formula (other formulas have been tested and lead to similar results).

$$\text{High\_threshold\_HU} = \min(100, (2 \times \text{min\_value} + \text{max\_value})/3).$$

Based on this thresholding value, the volume is binarized.

Connected Component Extraction

Then connected components are extracted from the binarized volume.

The connected component extraction technique is well-known in the art.

A connected component is defined as a group of voxels in which each voxel is adjacent to at least one of the other voxels in that connected component.

Adjacency in this context is defined in the 6-neighborhood sense (alternatives such as 8-neighborhood may be envisaged).

Connected Component Classification

Next, each connected component is assigned a type class: either a table or a non-table (body) component.

For time optimization considerations, small components are ignored at this step; they will be indirectly processed within the subsequent steps.

For each component, the following features are evaluated:
Volume and surface;
Voxel count, i.e. number of voxels within the component;
Porosity which measures empty space inside the component;
Maximum, average and standard deviation (standard_deviation) of the HU values within the component;
Sphericity of the component.

Considering the following conditions, a connected component is assigned to the Table class if it meets the condition number 1 and 2 as well as one of the conditions 3, 4 or 5.
1. surface $^{1.5}$ > 10×volume;
2. component's voxel count less than half voxel count within the entire thresholding mask;
3. maximum<550HU;
4. porosity<0.1;
5. spericity<0.7 and (average+standard_deviation) <600HU.

Condition 1 ensures that the component is thin enough (as tables are rather thin).

Condition 2 is based on the fact that a table always corresponds to a small part of the volume.

Conditions using HU values are based on the observation that table luminosity values in CT studies are relatively low and present low variations.

Condition 4 is based on the fact that tables are often full structures, so porosity values should be very low within such structures if the thresholding value is appropriate.

At the end of this coarse filtering step, a set of components form the table shape and another list must exist to form the body shape.

If it is not the case, i.e. if all components are assigned to the Table class, this step is re-executed with a different threshold value.

Let table_shape be the mask of Table connected components and body_shape the mask of non-table components.

2. The Second Step is an Iterative Low Threshold Filtering Step.

The conditions used in the above described coarse classification step are not strong enough to filter all the body components.

Besides, the threshold value defined there is often too high to detect all the table components. For these reasons, further connected component classifications under lower HU threshold values are performed within this second step.

This step, as well as the previous one, can be easily parallelized as each component, extracted under a given threshold, can be processed independently of the other components extracted under the same threshold.

a. Iterations

A list of connected components called fuzzy_components, is extracted.

This list is initially empty.

We also define a HU thresholding value (threshold_HU) which is incremented in every iteration. In the described preferred embodiment an incrementation of 200HU in every iteration step is used.

In the performed experiments, threshold_HU was initialized with 'High_threshold_HU–400' or 'High_threshold_HU–600' depending on the data size. Experiments have shown that the chosen increment value gives good classification results. Choosing a lower value may lead to more accurate results but it would require more iterations (and subsequently more time).

The following operations are repeated until no fuzzy component is encountered (in the last iteration) or the thresholding value reaches the high threshold value defined within the coarse classification step (High_threshold_HU).

1) Threshold the volume with the threshold_HU value and extract the connected component list from the resulting thresholding mask.

2) For each connected component cc:

If cc intersects table_shape and does not intersect body_shape, then add cc to table_shape (this would add the previously ignored small components to the table mask), Else if cc intersects body_shape and does not intersect table_shape, then add cc to the non-table mask (body_shape).

Else (if it intersects both masks), add cc to the fuzzy_components list.

3) Increment threshold_HU

3. The Third Step is a Location Based Filtering Step

The location based filtering consists in assigning any component which is surrounded (in the left, right, posterior and anterior sides or the top and bottom sides) by body components to the non-table class. Indeed, table are always located within the volume borders.

Fuzzy Region Filtering

The fuzzy component filtering must be processed after the location based filtering, as a last filtering step.

It consists in rectifying the results of the coarse classification step based on the component's position relatively to the fuzzy regions in one hand and their shapes in the other hand.

Each components of the fuzzy_components list can be processed in parallel with the others.

The filtering processes defined in the following sections are executed for each connected component from the fuzzy_components list.

Position Based Filtering

All table components must be located next to the volume border. Thus, if a table component (given by the coarse classification step) is included within a fuzzy region without touching its borders, it is removed from the table mask.

Shape Based Filtering

The shape based filtering aims at reassigning the body border components that have been wrongly classified as tables.

Since the fuzzy components are extracted under low thresholding values, they probably include such false table detection connected to body tissues. However, true table regions may be also connected to body structures in a mask given by a low threshold value, so this filtering is performed to distinguish these two cases. In the case of correct classification (second case), the fuzzy region containing table and non-table components should include an important ratio of empty space (example in FIG. 3.c), contrary to a region containing only body tissue.

Based on this observation, we define the shape based filtering as follows:

1) Define the full convex hull (full refers to the hull plus all elements delimited by the hull) containing the fuzzy component.

Figure 3:
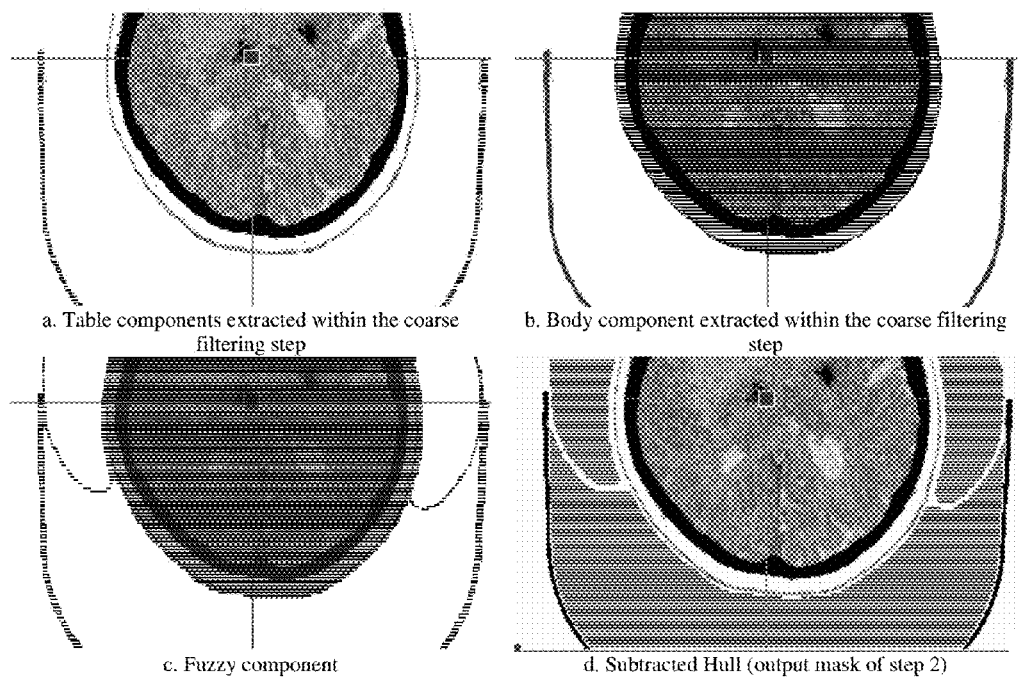
FIG. 3 is an illustration of shape based filtering within a fuzzy region. The shaded area corresponds to mask voxels.

2) Subtract the table components and the body components (extracted within the coarse filtering step) from that full hull (example in FIG. 3.d).

3) If the voxels in the output mask of step 2 are scattered or their count number is insignificant compared to the number of voxels in the output mask of step 1, the fuzzy region is assigned to the non-table type.

In the case illustrated in FIG. 3, the output mask of step 2 is continuous and composed of an important number of voxels; so the initial component types are considered correct and the table mask remains unchanged.

Having described in detail preferred embodiments of the current invention, it will now be apparent to those skilled in the art that numerous modifications can be made therein without departing from the scope of the invention as defined in the appending claims.

The invention claimed is:

1. A method for removing a support for an object from a volume data representing a radiation image of the object, the method comprising the steps of:

subjecting the volume data to a coarse filtering process including the steps of:

applying a first thresholding process with a coarse threshold value to the volume data to obtain a binarized result;

extracting connected components from the binarized result;

obtaining a first classification by assigning either a support type class or a non-support type class to the connected components to generate a support mask and a non-support mask; and subjecting the volume data to an iterative low threshold filtering process using successively lower thresholding values to correct results of the first thresholding process to obtain a corrected result; wherein the iterative low threshold filtering process includes a shape-based filtering step based on a convex hull of the connected components.

2. The method according to claim 1, wherein the iterative low threshold filtering process is performed to generate thresholding masks and to extract the connected components from the thresholding masks; and the iterative low threshold filtering process is performed until either the thresholding value equals the coarse threshold value or no further connected components are obtained that do not intersect either the support mask or the non-support mask, and one or more of the connected components extracted during the iterative low threshold filtering process is/are used to obtain a rectified result of the coarse filtering process.

3. The method according to claim 2, wherein a location-based filtering is applied to the rectified result of the coarse filtering process.

4. The method according to claim 2, wherein the rectified result of the coarse filtering process is rectified by performing the steps of:

adding a connected component extracted during the iterative low threshold filtering process to the support mask if the connected component intersects the support mask and not the non-support mask;

adding a connected component extracted during the iterative low threshold filtering process to the non-support mask if the connected component intersects the non-support mask and not the support mask;

adding one of the connected components extracted during the iterative low threshold filtering process to a fuzzy components list if the connected component intersects both the support mask and the non-support mask; and subjecting the fuzzy components list to the shape based filtering process to decide whether a fuzzy component is assigned to the support mask or the non-support mask.

5. The method according to claim 1, wherein the coarse threshold value is determined based on a histogram of data values in a volume data representation of the radiation image.

6. The method according to claim 1, wherein the support type class or the non-support type class is assigned to one of the connected components depending on an evaluation of at least one of the following features:
- volume and surface of the respective connected component;
- number of voxels in the respective connected component;
- porosity;
- statistical values of volume data values within the respective connected component; and
- sphericity of the respective connected component.

7. The method according to claim 4, wherein the shape-based filtering step includes the steps of:
- defining a full convex hull containing the fuzzy components;
- subtracting the support type connected components and the non-support type connected components extracted in the coarse filtering process from the full convex hull to obtain an output mask; and
- if voxels in the output mask are scattered or a number of the scattered voxels is insignificant compared to a number of voxels in the output mask in the defining step, the fuzzy component is assigned to the non-support type class, otherwise the fuzzy component is assigned to the support mask.

8. A non-transitory computer readable medium comprising computer executable program code to carry out, when the computer executable program is executed on a computer, the method according to claim 1.

* * * * *